United States Patent [19]

Nishimura et al.

[11] Patent Number: 5,415,028

[45] Date of Patent: May 16, 1995

[54] MISFIRE DETECTING DEVICE FOR INTERNAL COMBUSTION ENGINE

[75] Inventors: Yukinobu Nishimura; Akira Demizu, both of Hyogo, Japan

[73] Assignee: Mitsubishi Denki Kabushiki Kaisha, Tokyo, Japan

[21] Appl. No.: 70,917

[22] Filed: Jun. 4, 1993

[30] Foreign Application Priority Data

Jun. 15, 1992 [JP] Japan .................................. 4-155059

[51] Int. Cl.⁶ ............................................ G01M 15/00
[52] U.S. Cl. .................................................... 73/117.3
[58] Field of Search .............................. 73/116, 117.3

[56] References Cited

U.S. PATENT DOCUMENTS

| | | | |
|---|---|---|---|
| 3,972,230 | 8/1976 | Hanson et al. | 73/116 |
| 5,088,318 | 2/1992 | Osawa | 73/117.3 |
| 5,191,788 | 3/1993 | Nishimura | 73/117.3 |
| 5,200,899 | 4/1993 | Ribbens et al. | 364/431.08 |
| 5,222,392 | 6/1993 | Baba et al. | 73/116 |
| 5,245,865 | 9/1993 | Kayanuma | 73/117.3 |
| 5,245,866 | 9/1993 | Hashiguchi et al. | 73/117.3 |
| 5,278,760 | 1/1994 | Ribbens et al. | 364/431.07 |

FOREIGN PATENT DOCUMENTS

4002209  8/1991  Germany .

*Primary Examiner*—Robert Raevis
*Attorney, Agent, or Firm*—Sughrue, Mion, Zinn, Macpeak & Seas; Richard C. Turner; Paul D. Sorkin

[57] ABSTRACT

A misfire detecting device is provided with a rotation detecting sensor 3 for detecting rotation signals corresponding to the timing of ignition of the cylinders of an engine. The device further includes a control unit which has continuous misfire detecting means for detecting the occurrence of a continuous misfire in the engine and intermittent misfire detecting means for detecting the occurrence of an intermittent misfire in it. Those detecting means operate according to the rotation signals provided by the rotation detecting sensor. When either the continuous misfire detecting means or the intermittent misfire detecting means detects the occurrence of a misfire, it is determined that a misfire has actually occurred in the engine. The continuous misfire determining means has arithmetic means for calculating a rotation variation rate from a deviation in rotation period of one and the same segment of the rotation detecting rotor, and the intermittent misfire detecting means also has arithmetic means for calculating a rotation variation rate from a deviation in rotation period corresponding to the order of combustion of the cylinders, and has misfire detecting threshold values respectively for the cylinders.

6 Claims, 7 Drawing Sheets

MISFIRE DETECTING DEVICE FOR INTERNAL COMBUSTION ENGINE

BACKGROUND OF THE INVENTION

1. Field of Invention

This invention relates to a device for detecting the occurrence of misfires in an internal combustion engine, and more particularly to a misfire detector for an internal combustion engine which utilizes variations in rotation of the engine to detect the occurrence of a misfire in it with high accuracy.

2. Description of Prior Art

There are available a variety of misfire detecting devices in the art. A misfire detecting system utilizing variations in rotation of the engine has been proposed, for instance, by Unexamined Japanese Patent Publication (Kokai) Sho-58-19532/(1983). The conventional device is designed as follows: In the device, there are provided rotation detecting intervals in the first half and the second half of the stroke of expansion of the engine, respectively, and when the difference in the speeds of rotation detected in those intervals is larger than a predetermined value, it is determined that a misfire has occurred in the engine.

In another conventional misfire detecting device, a deviation in the period of rotation is detected every ignition cycle, and it is divided by the average value of the periods of rotation to obtain a rotation variation rate, from which it is determined whether or not a misfire has occurred.

As is apparent from the above description, the conventional method is based on the variations in rotation of the engine; more specifically, the detection of a misfire is based on the fact that when a misfire occurs with a cylinder of the engine, the period of rotation of the cylinder is increased. However, the conventional device suffers from the following difficulty: In the cases where, in a multicylinder engine, a misfire occurs with a certain cylinder continuously, and it occurs with it intermittently, the variations in rotation are different in pattern, and therefore it is impossible for the device to detect the occurrence of a misfire with high accuracy (in order to meet the U.S. regulation OBD-II, the detection must be made to a misfire percentage of about 2%).

SUMMARY OF THE INVENTION

Accordingly, an object of this invention is to eliminate the above-described difficulties accompanying a conventional misfire detecting device. More specifically, an object of the invention is to provide a misfire detecting device which utilizes variations in rotation of an engine to detect a continuous misfire and an intermittent misfire of the engine with high accuracy; that is, a misfire detecting device which is most suitable in operating characteristic for detection of both a continuous misfire and an intermittent misfire in the engine.

Another object of the invention is to provide a misfire detecting device high in accuracy which is improved in misfire detecting characteristic, and has rotation detecting means which is substantially free from mechanical dimensional errors.

In order to achieve the foregoing objects of the invention, a misfire detecting device for an internal combustion engine, according to the invention, comprises: a rotation detector comprising a rotation detecting rotor and a rotation detecting sensor mounted on the crank shaft of the engine, for detecting rotation signals corresponding to the ignition periods of cylinders forming the engine; and a continuous misfire detector and intermittent misfire detector for detecting a continuous misfire and an intermittent misfire, respectively, according to the rotation signals provided by the rotation detector. When either the continuous misfire detector or the intermittent detector detects a misfire, it is determined that a misfire has actually occurred.

In the misfire detecting device, the continuous misfire detector comprises a calculator for calculating a rotation variation rate from a deviation in rotation period of one and the same segment of the rotation detecting rotor, and the intermittent misfire detector comprises a calculator for calculating a rotation variation rate from a deviation in rotation period corresponding to the order of combustion of the cylinders, and has misfire detecting threshold values respectively for the cylinders.

That is, the misfire detecting device of the invention is improved in misfire detecting characteristic by employing methods which are most suitable for the patterns of misfires; continuous misfires and intermittent misfires. As for a continuous misfire and an intermittent misfire, a misfire percentage is decided for every cylinder, so as to finally determine the cylinder with which a misfire has actually occurred. Thus, the difficulty is positively eliminated that, although the engine is operating satisfactorily, because of the vehicle travelling on an uneven road a determination is erroneously made as if a misfire occurred in the engine.

DETAILED DESCRIPTION OF PREFERRED EMBODIMENTS

One preferred embodiment of this invention will be described with reference to the accompanying drawings.

Figure 1:
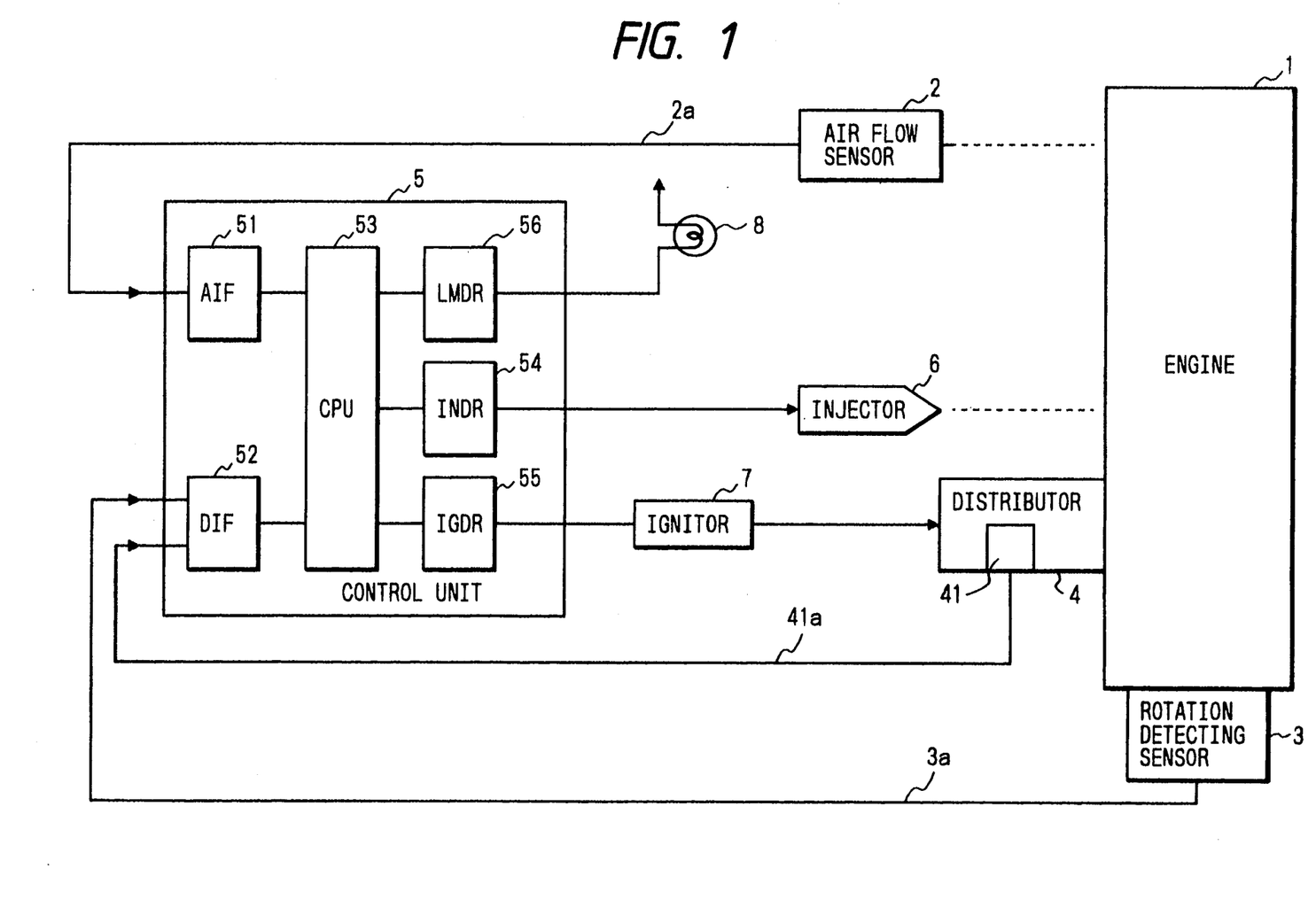
FIG. 1 is a block diagram for a description of one example of a misfire detecting device according to this invention which is applied to the electronic control device of an engine.

FIG. 1 is a block diagram showing one example of a misfire detecting device of the invention which is applied to an electronic control device for an engine. In FIG. 1, reference numeral 1 designates a four-cylinder gasoline engine. A thermal air flow sensor 2 is provided in the suction path of the engine 1, to output a quantity-of- suction-gas signal 2a, which is applied to a control unit 5. Further in FIG. 1, reference numeral 3 designates a rotation detecting sensor mounted on the crank shaft of the engine, to output a rotation signal 3a which is applied to the control unit 5; 4, a distributor mounted on the cam shaft of the engine. The distributor 4 accommodates a cylinder identifying sensor 41. The latter 41 outputs a cylinder identification signal 41a, which is applied to the control unit 5.

The control unit 5, receiving the quantity-of-suction-gas signal 2a, the rotation signal 3a, the cylinder identification signal 41, and other signals such as a water temperature signal, and a throttle degree-of-opening signal (not indicated in FIG. 1), drives an injector 6, and an ignitor 7, and detects the occurrence of a misfire to turn on an alarm lamp 8. That is, the control unit has a fuel controlling function, an ignition controlling function, and a misfire detecting function. It is not always necessary to provide the alarm lamp 8 for detection of a misfire only; that is, it may used for other purposes. The control unit 5 comprises an analog interface (AIF) 51, and a digital interface (DIF) 52. The outputs of those interfaces are applied to a CPU 53, where they are operated according to a predetermined program (described later), so that the fuel control, the ignition control, the misfire detection control and the display control are performed through an injector drive (INDR) 54, an ignition driver (IGDR) 55, and a lamp driver (LMDR) 56.

Figure 2:
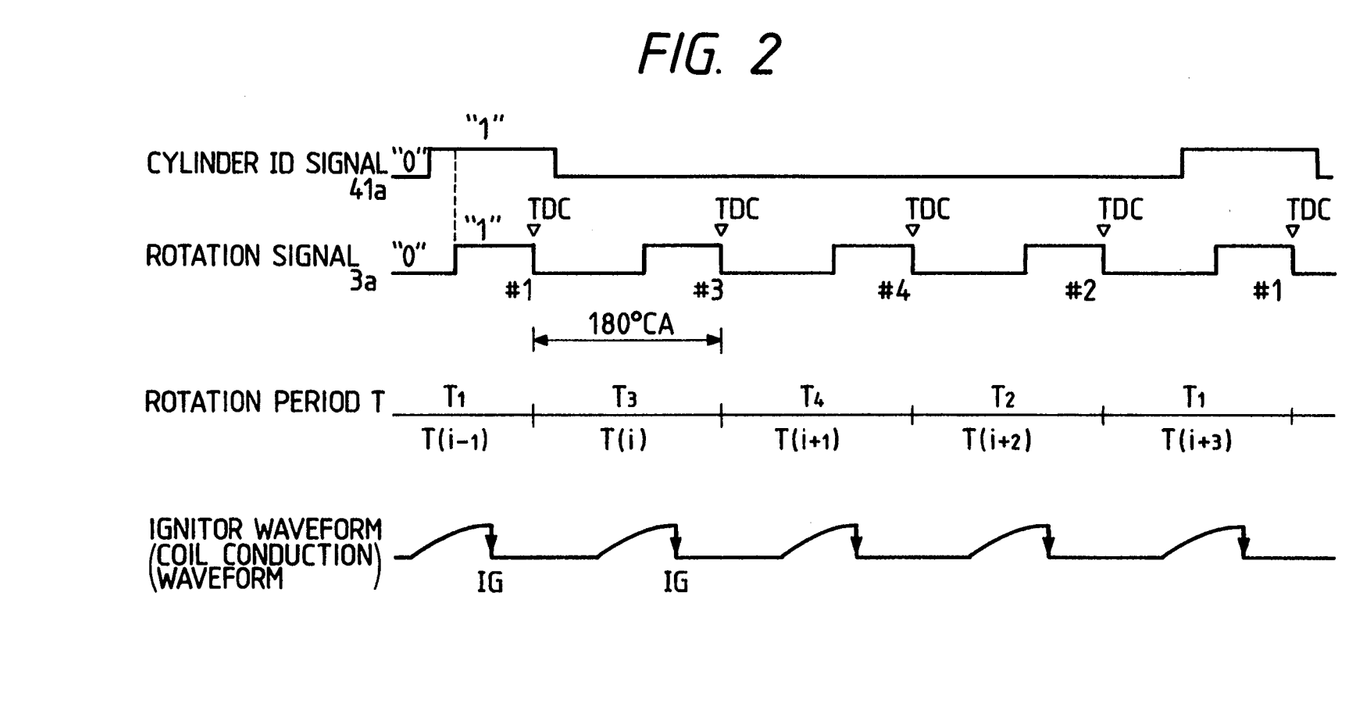
FIG. 2 is a time chart for a description of the timing of a rotation signal, a cylinder identifying signal, and so forth in FIG. 1.

FIG. 2 is a diagram for a description of the timing of the rotation signal outputted by the rotation detecting sensor 3, the cylinder identification signal outputted by the cylinder identifying sensor 41, and so forth. The cylinder identification signal 41 is of one-cycle with respect to four cycles of the rotation signal 3a. A cylinder, the cylinder identification signal of which is raised to "1" at the rise of the rotation signal 3a (70° CA (crank angle) before the top dead center (TDC) of the engine) is the cylinder #1; and the remaining cylinders, the cylinder identification signals of which are set to "0", are the cylinders #2, #3 and 4 in the order of power distribution.

In this connection, a cylinder identifying process according to a flow chart (described later) is carried out according to the above-described method. A rotation period T which is the period between respective TDCs is shown in FIG. 2. This rotation period is employed also for the fuel control and the ignition control.

Figure 3A:
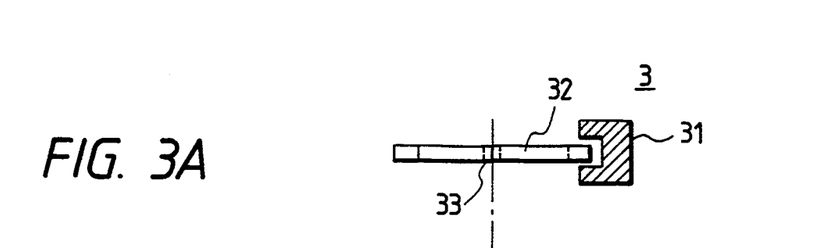
FIGS. 3A and 3B are is an explanatory diagram showing the arrangement of a rotation detecting sensor, and a rotation detecting rotor.
Figure 3B:
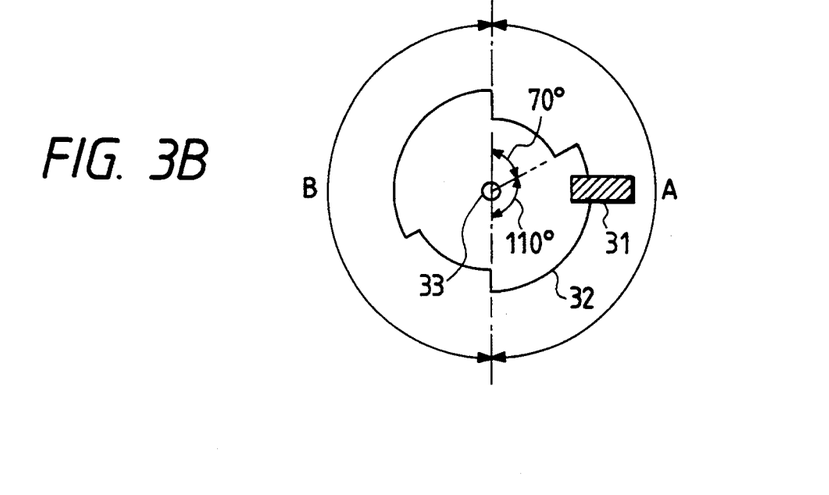

The rotation detecting sensor 3 for providing the aforementioned rotation signal will be described with reference to FIGS. 3A and 3B. FIGS. 3A and 3B show a Hall type rotation detecting sensor unit 31, and a detecting rotor 32. The rotor 32 is mounted on the crank shaft 33 of the engine. The Hall type rotation detecting sensor unit 31 detects two segments A and B during one revolution (360° CA). That is, the rotation detecting sensor 3 generates the rotation signal 3a in correspondence to the ignition timing of each cylinder, which is divided, for instance, into a level "0" interval of 110° and a level "1" interval of 70° for every period of 180° corresponding to each of the segments A and B with the TDC as a reference point.

Figure 4:
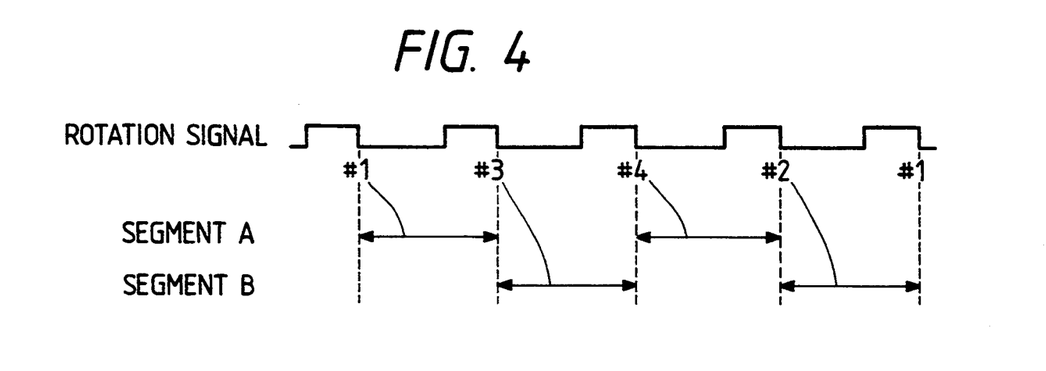
FIG. 4 is an explanatory diagram for a description of the relationships between the rotation detection signal shown in FIG. 2 and segments shown in FIG. 3.

FIG. 4 shows the rotation signal with the segments A and B which have been described with reference to FIG. 3. As for the cylinders #1 and #4, the segment A is used for detection of the rotation (measurement of the period T(i)); and as for the cylinders 3 and #2, the segment B is used for the same purpose. Hence, the mechanical dimensional errors in set angle of the segments A and B will affect the period of rotation. The degree of effect is such that the error is of the order of 0.1° CA with a rotor diameter of 100 Φ, thus corresponding to the variation in rotation at the occurrence of a misfire when the engine speed is 6000 rpm, and the load is −400 mmHg. The effect cannot be neglected. Hence, a misfire detecting logic should be provided which is scarcely affected thereby.

Now, an arithmetic operation for detection of a misfire will be described. In a conventional method of detecting the occurrence of a misfire in an engine from variations in rotation of the engine, a deviation in period of each cylinder is detected. In order to make the deviation dimensionless, it may be divided by the average period. In this case, the following arithmetic expression (1.1) can be considered for a four-cylinder engine:

$$S(i) = \frac{T(i) - T(i-1)}{\frac{1}{4} \sum_{m=i-3}^{i} T(m)} \quad (1.1)$$

When a misfire occurs, in Expression 1.1, $T(i) > T(i-1)$. When this difference in period is large; that is, when $S(i)$ is large, it is determined that a misfire has actually occurred, and the cylinder with which the misfire has occurred (hereinafter referred to as "a misfire cylinder", when applicable) is identified. However, the above-described rotation detecting sensor 3 suffers from the following problem: As is apparent from the structure of the rotation detecting sensor, the period difference $\{T(i) - T(i-1)\}$ between the cylinders adjacent to each other in the order of electric distribution includes the above-described segment error. Thus, with the rotation detecting sensor 3, it is difficult to detect the occurrence of a misfire particularly when the rotation is high and the load is light.

Figure 5:
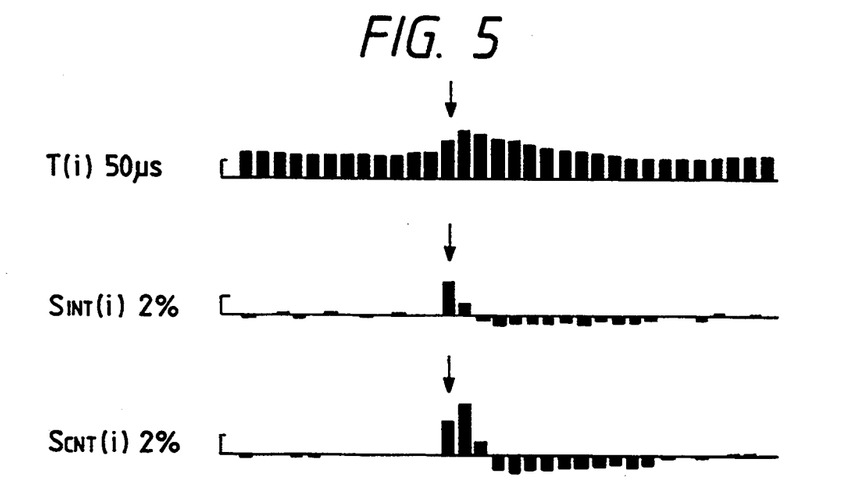
FIG. 5 is a diagram showing signals handled in the misfire detecting device at the occurrence of an intermittent misfire.
Figure 6:
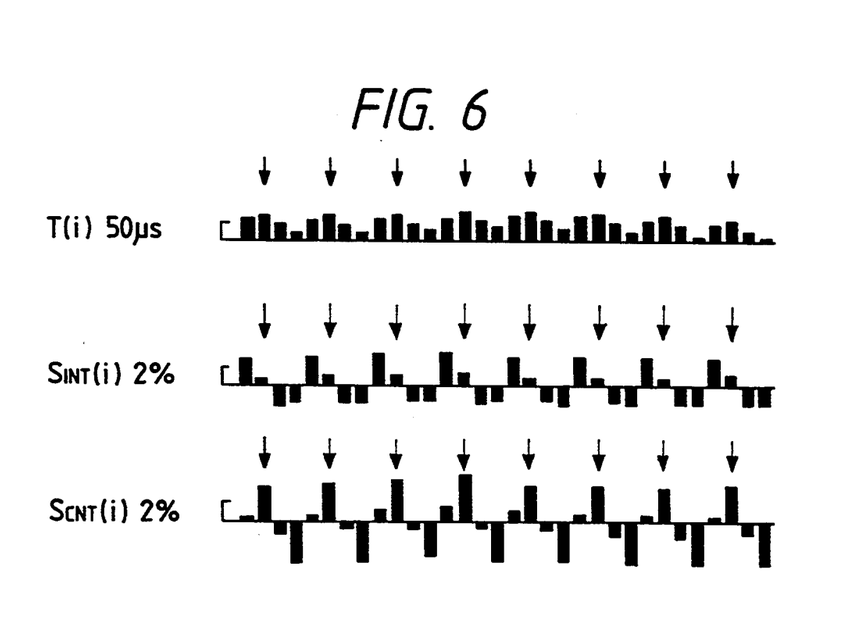
FIG. 6 is a diagram showing signals handled in the misfire detecting device at the occurrence of a continuous misfire.

In FIG. 5, $T(i)$ indicates a deviation in rotation period from an average rotation period when, in a four-cylinder engine, a misfire occurs intermittently with the cylinder #1 at an operating point of 3000 rpm and −400 mmHg. Similarly, in FIG. 6, $T(i)$ indicate a deviation in rotation period from an average rotation period when, in the four-cylinder engine, a misfire occurs continuously with the cylinder #1 at the same operating point. As is apparent from FIGS. 5 and 6, a period variation pattern (Ti) provided when a misfire occurs continuously is clearly different from that which is provided when a misfire occurs intermittently. When the arithmetic expression (1.1) is employed, the behaviors areas indicated at SNT(i) in FIGS. 5 and 6. In FIGS. 5 and 6, the misfire cylinders are indicated by the arrows. Therefore, in the case where a misfire occurs intermittently, the misfire cylinder may be detected and identified; however, in the case where a misfire occurs continuously, it is rather difficult to positively detect and identify the misfire cylinder.

Now, a misfire detecting method according to the invention will be described which is applicable to both detection of intermittent misfires and detection of continuous misfires, with the above-described effects of the segment error of the rotation detecting sensor taken into account.

Assuming that the rotation period of a cylinder is Ti, its rotation variation rate SNT(i) (where "NT" being the suffix used for an intermittent fire in a four-cylinder engine) is calculated from the following expression (1.2):

$$S_{INT}(i) = \frac{T(i) - T(i-1)}{\frac{1}{4}\sum_{m=i-3}^{i} T(m)} \qquad (1.2)$$

In addition, assuming that the rotation variation rate has an average value of $Th_j(i-1)$, a threshold value $Th_j(i)$ for decision of the occurrence of a misfire is calculated according to the following expression (1.3):

$$Th_j(i) = (1-k)Th_j(i-1) + k\, S_{kj}(i) \qquad (1.3)$$

where $0 < k < 1$, and j is suffix for a certain cylinder. And, when the following misfire deciding expression (1.4) is satisfied, it is determined that an intermittent misfire has occurred:

$$S_{INT}(i) \geq Th_j(i) + g(L, N) \qquad (1.4)$$

where $g(L, N)$ is the function of a load L and a number of revolutions N when the engine is in operation.

The above-described expression (1.2) is substantially equal to the above-described expression (1.1). Expression (1.3) is a parameter for determining a threshold value to decide whether or not a misfire has occurred, and a primary filter of $S_{INT}(i)$ of each cylinder; that is, it corresponds to the average value of the rotation variation rates SNT(i) of the cylinders. Expression (1.4) is the misfire deciding expression as was described above. When the expression (1.4) is satisfied, it is determined that a misfire has occurred with the cylinder (J). In Expression (1.4), the function g on the right side is constituted by a two-dimensional map with N (number of revolution) and L (load) as parameters so that it can be set for the average value $Th_j(i-1)$ of $S_{INT}(i)$ on the left side.

As is apparent from the above description, according to the invention, an intermittent misfire is detected by using the above-described expressions (1.2), (1.3) and (1.4), which eliminates the above-described effects of the segment error of the rotation detecting sensor 3. This is because, in the misfire detection, the comparison is made with one and the same cylinder; that is, with one and the same segment. In this connection, in order to eliminate the effects of the segments of the rotation detecting sensor 3, the numerator on the right side of the above-described expression (1.2) may be changed into $T(i) - T(i-2)$. However, expression (1.2) is superior in the sensitivity of detection as shown in FIG. 5 {$S_{INT}(1)$—Expression (1.2), and $S_{CNT}(i)$—the above-described modification of the expression (1.2)}.

Hereunder, the suffix letter "CNT" is employed for data in the detection of a continuous misfire, and it is assumed that a rotation period is represented by Ti. Under this condition, a rotation variation rate $S_{CNT}(i)$ is calculated from the following expression (2.2):

$$S_{CNT}(i) = \frac{T(i) - T(i-2)}{\frac{1}{4}\sum_{m=i-3}^{i} T(m)} \qquad (2.2)$$

And its difference $\Delta S_{CNT}(i)$ is calculated from the following expression (2.3):

$$\Delta S_{CNT}(i) = S_{CNT}(i) - S_{CNT}(i-1) \qquad (2.3)$$

When the following expression (2.4) is satisfied, it is determined that a continuous misfire has occurred:

$$\Delta S_{CNT}(i) \geq f(L, N) \qquad (2.4)$$

where $f(L, N)$ is the function of L (load) and N (number of revolutions) when the engine is in operation.

That is, in the case of a continuous misfire, the lo rotation changes periodically in correspondence to the number of cylinders. Therefore, a continuous misfire, unlike an intermittent misfire, cannot be detected even if the comparison is made with one and the same cylinder. Hence, the comparison must be made between cylinders. In this connection, it is preferable that the comparison is made between the cylinders which are adjacent to each other in the order of electric distribution and of one and the same segment. This is the reason why the misfire detecting arithmetic expression (2.2) has been provided.

The variation in rotation has a period corresponding to the number of cylinders. Therefore, in order to increase the sensitivity, the comparison should be made every ½ of the period. Hence, the operation $S_{CNT}(i) - S_{CNT}(i-2)$ of expression (2.2) is performed for $\Delta S_{CNT}(i)$. Furthermore, in order to set the decision value according to the operating condition of the engine, expression (2.4) with N (number of revolutions) and L (load) as parameters is employed.

FIG. 6 indicates the rotation period T(i) and the rotation variation rate $S_{CNT}(i)$ when a misfire occurs continuously. It can be readily understood from the abovedescribed expression (2.3) of $\Delta S_{CNT}(i)$ that the detection is further increased in sensitivity.

As is apparent from the above description, according to the invention, a continuous misfire and an intermittent misfire can be suitably detected by using the above-described expressions with the effects of the segments of the rotation detecting sensor taken into account. In addition, by providing routines for detecting a continuous misfire and an intermittent misfire separately, the patterns peculiar thereto can be detected. Furthermore, in the case where, for instance when the vehicle is driving on the uneven road, the rotation changes at random similarly as in the case of the occurrence of misfires, the occurrence of an intermittent misfire and that of a continuously misfire can be detected in a predetermined detecting interval (for instance an interval of 1000 ignitions).

Where, in this case, it can be considered that misfires have occurred with a plurality of cylinders, it is not determined that a misfire has actually occurred; that is, it is determined that the detection is made erroneously because of the vehicle running on the uneven road. This means that, in decision of the occurrence of a misfire, the detecting operation is performed with high reliability. In the embodiment, when a misfire occurs with one cylinder, it is determined that a misfire has occurred actually. However, the procedure may be so modified that, when a misfire occurs with two cylinders, it is determined that a misfire has occurred actually, and when more than two cylinders change in rotation, it is determined that it is due to the fact that, for instance, the vehicle is traveling on the uneven road.

Figure 7:
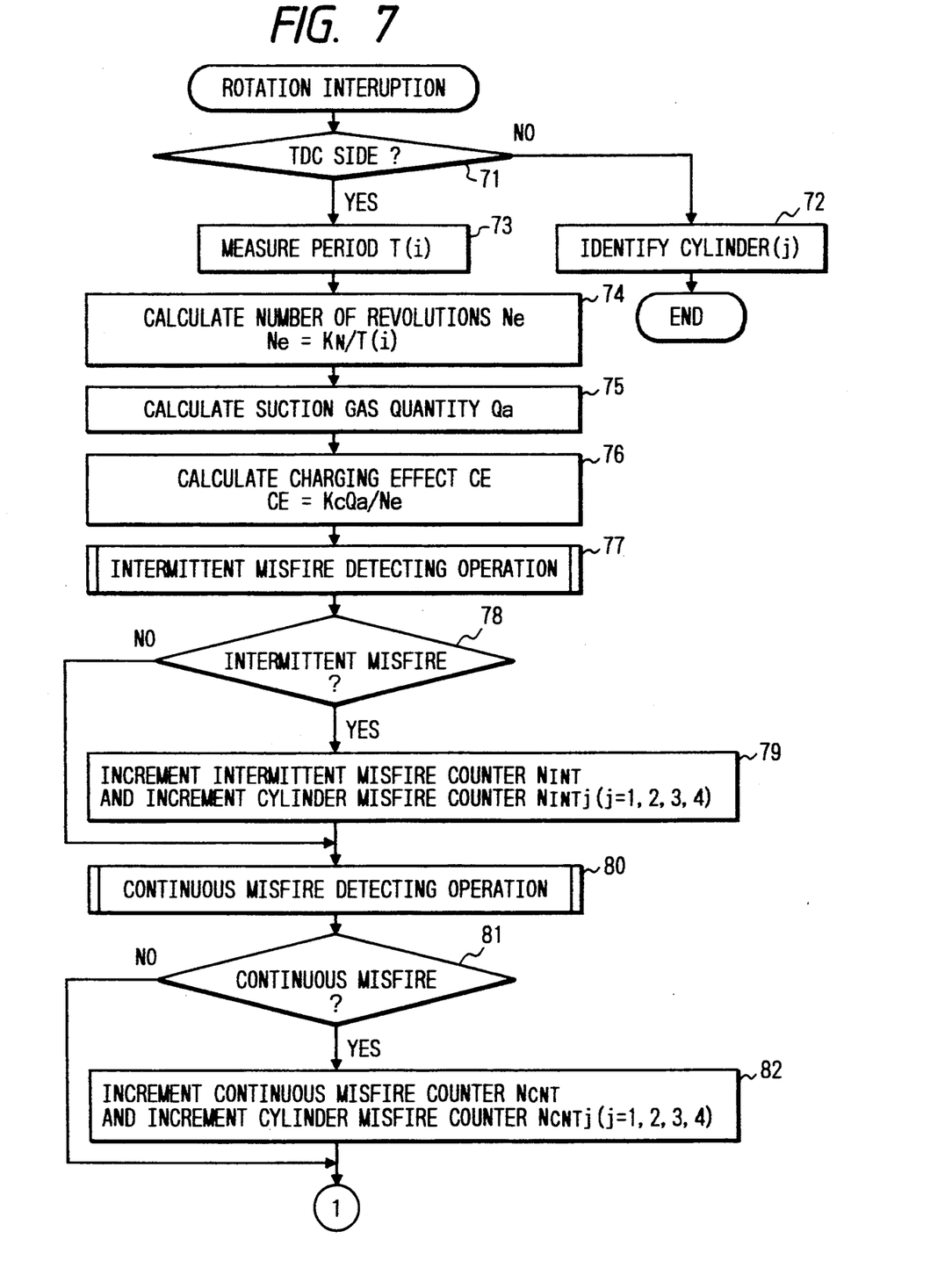
FIGS. 7, 8 and 9 are flow charts showing the operation of the misfire detecting device according to the invention.

Now, a misfire detecting process will be described with reference to a flow chart shown in FIGS. 7 through 9. Referring to FIG. 7, there are two kinds of rotation interrupt signal; one corresponds to the rising edge (BTDC (before top dead center) 70° CA) of the rotation signal 3a in FIG. 2, and the other to the falling edge (TDC) of the same signal 3a. In Step 71, it is determined which of the rotation interrupt signals is issued. When it is determined that the rotation interrupt signal is of the rising edge (BTDC 70° CA), Step 72 is effected, in which the above-described cylinder identification is carried out (hereinafter, the cylinder thus identified being referred to as a J cylinder), and the process is ended. In the case when the rotation interrupt signal is of the falling edge (TDC), Step 73 is effected. In Step 73, the time interval between the time instant of the fall edge and the time instant of the preceding interruption is detected to obtain a rotation period T(i), which is converted into the number of revolutions Ne in Step 74.

Next, in Step 75, a quantity of suction gas Qa is calculated. More specifically, during the period T(i), a quantity of suction gas is calculated with a predetermined sampling period in a processing operation not shown, and in Step 75 the quantities of suction gas thus calculated are averaged to obtain the data Qa. In Step 76, a load is obtained. The load is selected with a charging effect CE as a parameter.

Thereafter, in Step 77, an intermittent misfire detecting calculation is performed according to the above-described expressions (1.2), (1.3) and (1.4). In the calculation, the charging effect CE obtained in Step 76 is used as the load, and the data Ne obtained in Step 74 is employed as the number of revolutions. When it is determined that an intermittent misfire has occurred in Step 78, Step 79 is effected. In Step 79, an intermittent misfire counter is incremented, and a misfire counter provided for the cylinder with which the misfire has occurred is incremented. Similarly as in the above-described case, in Steps 80, 81 and 82, a processing operation for a continuous misfire is carried out. A continuous misfire detecting calculation is performed according to the above-described expressions (2.2), (2.3) and (2.4).

Figure 8:
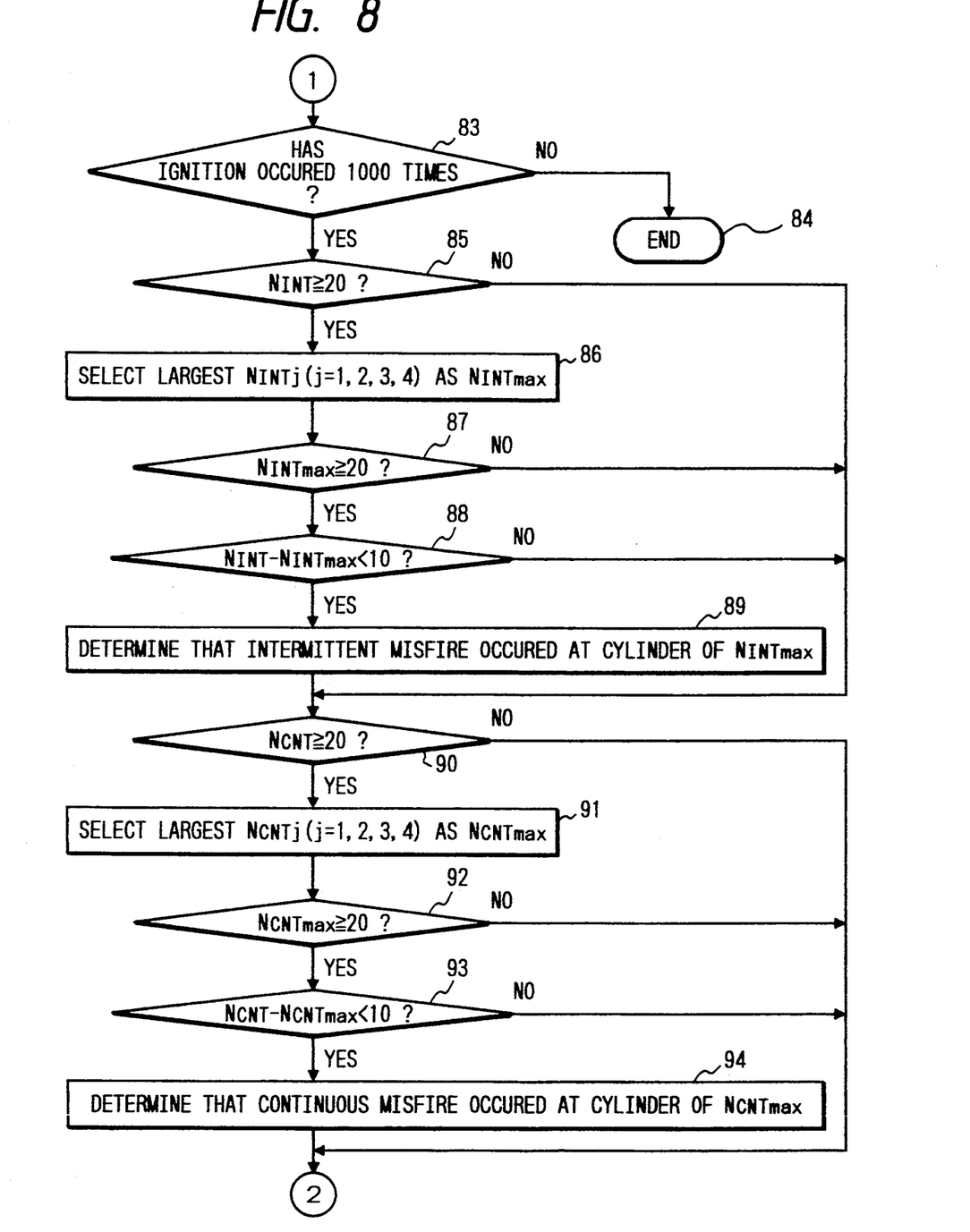

Thereafter, the processings of the flow chart of FIG. 8 is executed. That is, in the routine, it is detected how many times the intermittent or continuous misfire has occurred while the ignition is performed 1,000 times, and when a misfire has occurred with a cylinder a predetermined number of times, it is determined that a misfire has actually occurred with the cylinder.

In Step 83, it is detected whether or not the ignition is performed 1000 times. When the number of times of ignition is less than 1,000, then the routine is ended. Steps 85 through 89 are in a routine of determining whether or not an intermittent misfire has occurred. In Step 85, it is detected whether or not the number of times of intermittent misfire $N_{INT}$ is for instance at least twenty (20). When it is less than twenty (20), then Step 90 is effected. The value "twenty (20)" is to determine a misfire percentage In this case, it is determined more than 2.0% of the misfire rate.

Next, in Step 86, one of the misfire cylinders which is largest in the number of times of misfire $N_{INTj}$(j=1, 2, 3, 4) is selected, and its number of times of misfire is set to $N_{INTmax}$. When $N_{INTmax} \geq 20$ in Step 87, and $N_{INT} - N_{INTmax} < 10$ in Step 88, then Step 89 is effected. In Step 89, it is determined that an intermittent misfire has actually occurred with the cylinder the number of times of misfire of which is $N_{INTmax}$. That is, Step 88 is to improve the detection in reliability by employing a method in which, only when one cylinder is high in misfire percentage and the remaining cylinders are low in misfire percentage, it is determined that a misfire has actually occurred with the one cylinder. Similarly as in the above-described routine, Steps 90 through 44 are in a routine of deciding whether or not a continuous misfire has occurred.

Figure 9:
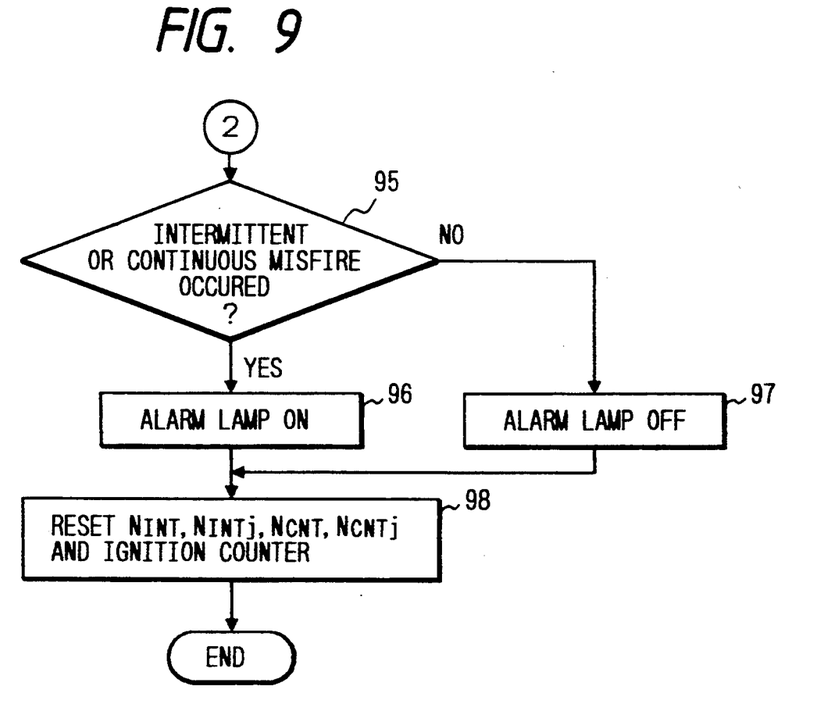

Thereafter, the routine in the flow chart of FIG. 9 is executed. In Step 95, it is determined whether or not the misfire decided is an intermittent or continuous misfire. Depending on the results of determination, the alarm lamp is turned on in Step 96 and turned off in Step 97. In Step 98, the counters are reset ($N_{INT}$, $N_{INTj}$, $N_{CNT}$, and $N_{CNTj}$) so as to be ready for the following misfire detecting operation.

As was described above, the misfire detecting device for detecting misfires in an engine by detecting variations in rotation of the engine, according to the invention, has the means for detecting continuous misfires in the engine, and the means for detecting intermittent misfires in it. Thus, the device is high in misfire detecting performance.

Furthermore, according to another aspect of the invention, the above-described expressions (1.2), (1.3) and (1.4) are utilized to detect the occurrence of an intermittent misfire, or the above-described expressions (2.2), (2.3) and (2.4) are utilized to detect the occurrence of a continuous misfire. Hence, the detection of misfires is free from the effects of the dimensional errors of the segments in the rotation detecting sensor. Thus, the detection is greatly improved in accuracy.

Moreover, according to another aspect of the invention, a continuous misfire and an intermittent misfire are detected separately in the predetermined detecting interval, and for both a continuous misfire and an intermittent misfire, a misfire percentage is decided for every cylinder, so as to finally determine the cylinder with which a misfire has actually occurred, which positively eliminate the difficulty that, although the engine is operating satisfactorily, because of the vehicle travelling on an uneven road determination is erroneously made as if a misfire occurred in the engine.

What is claimed is:

1. A misfire detecting device for an internal combustion engine, comprising:

rotation detecting means comprising a rotation detecting rotor and a rotation detecting sensor mounted on a crank shaft of said engine, for detecting rotation signals corresponding to ignition periods of cylinders of said engine;

continuous misfire detecting means for detecting a continuous misfire according to said rotation signals provided by said rotation detecting means; and intermittent misfire detecting means for detecting an intermittent misfire according to said rotation signals, wherein said continuous misfire detecting means comprises a first arithmetic means for calculating a rotation variation rate from a deviation in rotation period of one and the same segment of said rotation detecting rotor, and wherein said first arithmetic means calculates a rotation variation rate $S_{CNT}(i)$ from the following expression:

$$S_{CNT}(i) = \frac{T(i) - T(i - c/2)}{\frac{1}{c} \sum_{m=i-(c-1)}^{i} T(m)}$$

where T(i) is cylinder rotation period, and c is the number of cylinders, and calculates a difference $\Delta S_{CNT}(i)$ thereof from the following expression:

$$\Delta S_{CNT}(i) = S_{CNT}(i) - S_{CNT}(i-c/2),$$

and determines the occurrence of a continuous misfire when the following misfire determining expression is satisfied:

$$\Delta S_{CNT}(i) \geq f(L, N)$$

where f(L, N) is a function of a load L and an engine revolution rate N when said engine is in operation.

2. A misfire detecting device as claimed in claim 1, wherein said intermittent misfire detecting means comprises a second arithmetic means for calculating a rotation variation rate from a deviation in rotation period corresponding to an order of combustion of said cylinders, and has misfire detecting threshold values respectively for said cylinders.

3. A misfire detecting device as claimed in claim 2, wherein said second arithmetic means calculates a rotation variation rate $S_{INT}(i)$ from the following expression:

$$S_{INT}(i) = \frac{T(i) - T(i-1)}{\frac{1}{c} \sum_{m=i-(c-1)}^{i} T(m)}$$

where T(i) is a cylinder rotation period, and c is a number of cylinders, and calculates a misfire deciding threshold value $Th_j(i)$ from the following expression:

$$Th_j(i) = (1-k)Th_j(i-1) + \{KS_{kj}(i)\}KS_{INT_j}(i)$$

where $Th_j(i-1)$ is an average value of the rotation variation rates, $1 < k < 1$, and j is a suffix letter for a cylinder J, and decides the occurrence of an intermittent misfire when the following misfire deciding expression is satisfied:

$$\Delta S_{INT}(i) \geq Th_j(i) + g(L, N)$$

where g(L, N) is a function of a load L and a number of revolutions (N) when said engine is in operation.

4. A misfire detecting device as claimed in claim 1, in which a continuous misfire and an intermittent misfire are detected separately during a detecting interval corresponding to a predetermined number of times of ignition or a predetermined period of time, and a misfire condition is determined when a continuous misfire or intermittent misfire has been detected a predetermined number of times.

5. A misfire detecting device as claimed in claim 1, in which, when, in a case where misfires are detected with a plurality of cylinders during a detecting interval corresponding to a predetermined number of times of ignition or a predetermined period of time, a misfire percentage of one of said cylinders which is largest in a number of times of misfire is equal to or larger than a first predetermined value, and a sum of misfire percentages of remaining cylinders is equal to or smaller than a second predetermined value, a determination is made that a misfire has actually occurred with said one cylinder.

6. A misfire detecting device for an internal combustion engine, comprising:

rotation detecting means comprising a rotation detecting rotor and a rotation detecting sensor mounted on a crank shaft of said engine, for detecting rotation signals corresponding to ignition periods of cylinders of said engine;

continuous misfire detecting means for detecting a continuous misfire according to said rotation signals provided by said rotation detecting means; and intermittent misfire detecting means for detecting an intermittent misfire according to said rotation signals, wherein said continuous misfire detecting means comprises a first arithmetic means for calculating a rotation variation rate from a deviation in rotation period of one and the same segment of said rotation detecting rotor, and wherein said intermittent misfire detecting means comprises a second arithmetic means for calculating a rotation variation rate from a deviation in rotation period corresponding to an order of combustion of said cylinders, and has misfire detecting threshold values respectively for said cylinders;

wherein said second arithmetic means calculates a rotation variation rate $S_{INT}(i)$ from the following expression:

$$S_{INT}(i) = \frac{T(i) - T(i-1)}{\frac{1}{c} \sum_{m=i-(c-1)}^{i} T(m)}$$

where T(i) is a cylinder rotation period, and c is a number of cylinders, and calculates a misfire deciding threshold value $Th_j(i)$ from the following expression:

$$Th_j(i) = (1-k) \, Th_j(i-1) + kS_{INT_j}(i)$$

where $Th_j(i-1)$ is an average value of the rotation variation rates, $0 < k < 1$, and j is a suffix letter for a cylinder J, and determines the occurrence of an intermittent misfire when the following misfire determining expression is satisfied:

$$\Delta S_{INT}(i) \geq Th_j(i) + g(L, N)$$

where g(L, N) is a function of a load L and an engine revolution rate N when said engine is in operation.

* * * * *